United States Patent
August et al.

(10) Patent No.: US 12,545,968 B2
(45) Date of Patent: Feb. 10, 2026

(54) POSITION SPLITTING

(71) Applicant: Lisa Dräxlmaier GmbH, Vilsbiburg (DE)

(72) Inventors: Rafal August, Ergolding (DE); Robert Thalhammer, Aich (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 0 days.

(21) Appl. No.: 18/663,512

(22) Filed: May 14, 2024

(65) Prior Publication Data
US 2024/0301521 A1    Sep. 12, 2024

Related U.S. Application Data

(63) Continuation of application No. PCT/EP2022/081783, filed on Nov. 14, 2022.

(30) Foreign Application Priority Data

Dec. 1, 2021    (DE) .......................... 102021131632.4

(51) Int. Cl.
*C14B 1/14*    (2006.01)
*B26D 1/01*    (2006.01)
(Continued)

(52) U.S. Cl.
CPC ................ *C14B 1/14* (2013.01); *B26D 1/015* (2013.01); *B26D 3/28* (2013.01); *B26D 7/015* (2013.01)

(58) Field of Classification Search
CPC .. C14B 1/14; B26D 1/015; B26D 3/28; B26D 7/015
See application file for complete search history.

(56) References Cited

U.S. PATENT DOCUMENTS 795,359  A  *  7/1905  Moore ....................... B44C 1/24
                                                        156/254
801,673  A  *  10/1905  Moore .................... B26D 3/281
                                                        156/254
(Continued)

FOREIGN PATENT DOCUMENTS

DE        1822593 U       12/1960
DE    102020109206 A1     10/2021
(Continued)

OTHER PUBLICATIONS

Translation DE 102020109206.*
(Continued)

*Primary Examiner* — Shaun R Hurley
(74) *Attorney, Agent, or Firm* — Burris Law, PLLC

(57) ABSTRACT

A method for splitting a semi-finished product includes placement of the semi-finished product on a splitting template, and the splitting template includes at least one elevation. The method includes fixation of the semi-finished product on the splitting template, in which an area of the semi-finished product is arranged on the elevation. The method includes splitting of the semi-finished product, in which material is removed from the semi-finished product during splitting. The material removal in the area that is arranged on the elevation is greater than in an area that is not arranged on the elevation.

11 Claims, 2 Drawing Sheets

(51) Int. Cl.
*B26D 3/28* (2006.01)
*B26D 7/01* (2006.01)

(56) References Cited

U.S. PATENT DOCUMENTS

| | | | | |
|---|---|---|---|---|
| 1,757,160 A * | 5/1930 | Bates | ............ | A43D 8/48 |
| | | | | 12/142 J |
| 1,904,405 A * | 4/1933 | Cagglano | ............ | C14B 1/14 |
| | | | | 69/21.5 |
| 2,125,911 A | 8/1938 | Garfinkel et al. | | |
| 2,788,535 A * | 4/1957 | Tilson | ............ | A43D 8/34 |
| | | | | 69/13 |
| 3,513,496 A * | 5/1970 | Hacker | ............ | A43D 29/00 |
| | | | | 12/17 R |
| 9,419,669 B2 * | 8/2016 | Smith | ............ | B32B 37/30 |
| 9,485,338 B2 * | 11/2016 | Balaji | ............ | H04B 1/3888 |
| 10,044,395 B2 * | 8/2018 | Balaji | ............ | H04B 1/3888 |

FOREIGN PATENT DOCUMENTS

| | | |
|---|---|---|
| GB | 1178960 A | 1/1970 |
| WO | 9412671 A1 | 6/1994 |

OTHER PUBLICATIONS

Palksky 2 Pack 12 Cavity Medium Narrow Silicone Rectangle Molds (https://www.amazon.com/Palksky-Silicone-Rectangle-Cornbread-Cheesecake/dp/B07YZ8T4N2/ref=sr_1_40?crid=1J3FLL723VGQZ&dib=eyJ2ljoiMSJ%E2%80%A6&th=1), Date first available: Oct. 11, 2019.*

Office Action issued in corresponding DE Application 10 2021 131 632.4, issued Sep. 22, 2022, 4 pages.

* cited by examiner

POSITION SPLITTING

CROSS-REFERENCE TO RELATED APPLICATIONS

This application is a continuation of International Application No. PCT/EP2022/081783, filed on Nov. 14, 2022, which claims priority to and the benefit of DE 10 2021 131 632.4 filed on Dec. 1, 2021. The disclosures of the above referenced applications are incorporated herein by reference.

FIELD

The present disclosure relates to a method for splitting a semi-finished product including leather.

BACKGROUND

The statements in this section merely provide background information related to the present disclosure and may not constitute prior art.

Skiving and splitting of workpieces made of leather, in particular semi-finished products made of leather, has generally been known. The material thickness of the entire workpiece is reduced during splitting. This removes material from the surface of the workpiece. In contrast, the material thickness is reduced only in a certain area of the workpiece during skiving, in particular along the outer edges or along the outer contour of the workpiece. Skiving serves to improve the further processability of the workpiece. For example, the workpiece can be better beaded and/or better sewn in the skived, i.e., the thinned area.

Skiving or splitting machines known have the disadvantage that only simple, flat sections of the workpiece, in particular, straight strip sections of the workpiece, can be skived or locally split. Complex outer contours can only be skived manually, i.e., by hand, with a skiving knife and/or leather skiver.

SUMMARY

This section provides a general summary of the disclosure and is not a comprehensive disclosure of its full scope or all of its features.

The present disclosure provides a splitting method. In one form, the present disclosure provides a method for splitting a semi-finished product that enables mechanical skiving along a complex contour.

According to a first method, the semi-finished product is placed on a splitting template with at least one elevation. The semi-finished product and the splitting template are fixed relative to each other. The semi-finished product is split. During splitting, material is removed from the semi-finished product. The material removal from the semi-finished product is greater in an area that is arranged on the elevation than in an area that is not arranged on the elevation.

Generally, the present disclosure provides a method in which a semi-finished product is placed on a splitting template. The splitting template comprises at least one elevation. The semi-finished product is subsequently fixed on the splitting template. The semi-finished product may be fixed immovably to the splitting template due to the fixation. The semi-finished product is split. Material is removed from the semi-finished product during splitting. According to the present disclosure, the material removal in an area that is arranged on the elevation is greater than the material removal in an area that is not arranged on the elevation. For example, material may not be removed in an area which is not arranged on the elevation.

The method results in the material thickness of the semi-finished product in the area to be smaller after splitting, than was arranged on the elevation during splitting. The semi-finished product can be skived or locally split according to the arrangement and/or the shape of the elevation.

In the following, the term "material removal" is understood to mean the sum of the removed material per surface area unit, in one example per split surface area unit. Here the surface area unit is standardized in all the areas of the semi-finished product. For example, the material removal can be specified in grams per square centimeter.

In a first form, material can be removed from the entire semi-finished product during splitting. Here, more material may be removed in the area that is arranged on the elevation than in the area/areas which is not/are not arranged on the elevation.

As a result, the material thickness is reduced over the entire semi-finished product, in which in the same work step the semi-finished product is skived along the elevation. This means that the area that is arranged on the elevation experiences an additional material removal during splitting in addition to the material removal that every area of the semi-finished product experiences. This results in that two work steps, namely the thinning of the semi-finished product and the skiving of the semi-finished product in certain areas can be performed with a single step. The manufacturing process is thereby simplified and accelerated.

The semi-finished product may include or consist of a material that comprises leather. The semi-finished product may, in one variation, include leather. Before splitting, the semi-finished product can have aa substantially constant material thickness. Irrespective of this, the semi-finished product may have an outer contour that is defined by the outer edges of the semi-finished product. For example, the semi-finished product may be cut to size before it is placed on the splitting template or after splitting, such that the semi-finished product has its desired outer contour. The outer contour may have contour protrusions that protrude from the outer edges of the semi-finished product. For example, a contour protrusion may form a fixing tab that may be used to attach the semi-finished product to another component during downstream processing. In this case, it may be desirable for the fixing tab to remain unskived for reasons of strength.

In another form, the elevation substantially reproduces the outer contour of the semi-finished product. This means that the elevation may extend along the outer edges of the semi-finished product. The elevation, in one example, does not extend past the outer edges of the semi-finished product. This results in the outer contour or the outer contours of the semi-finished product being able to be skived by the splitting method. The outer contours of the semi-finished product may be of any shape. Contour protrusions may be left out, in other words, remain unskived during skiving.

In one example, the elevation causes the semi-finished product to have a first material thickness after splitting in the area that was arranged on the elevation during splitting. The area with the first material thickness is, in one example, arranged between two areas that have a second material thickness. Here the first material thickness is smaller than the second material thickness.

The areas that have the second material thickness may be arranged adjacent to the elevation during splitting. For example, the areas may be unskived areas of the semi-finished product. This means that in the areas that were not located on the elevation during splitting, less material or no material at all has been removed. This has the advantage that the semi-finished product can be skived or locally split at any position without affecting the adjacent areas of the semi-finished product. In addition, contour protrusions, such as, for example, fixing tabs on the semi-finished product, can remain unskived while the remaining outer contour of the semi-finished product is skived during splitting.

The elevation of the splitting template may cause the semi-finished product to be selectively skived or locally split. For example, an area of the semi-finished product in which material has been removed during splitting may be surrounded by an area of the semi-finished product in which no material or less material has been removed during splitting. The elevation of the splitting template may facilitate an island-shaped removal of material. This has the advantage that the semi-finished product may have point- or island-shaped recesses after splitting. This may simplify the further processing of the semi-finished product.

During splitting, the semi-finished product and the splitting template may be moved relative to a splitting tool in a feed direction. The feed direction may be defined such that the semi-finished product is moved toward the splitting tool during splitting. Alternatively, the splitting tool may be moved relative to the semi-finished product and the splitting template in a feed direction during splitting. In one example, the feed direction is directed toward the semi-finished product. The splitting tool may be a band knife or a blade. In addition, providing the feed direction enables the method for splitting the semi-finished product to be carried out simply and cost-effectively. Further, the present disclosure enables already available splitting- and skiving-machines to be used for the method.

In one form, the splitting template includes a first surface and a second surface. The second surface is, in one example, arranged opposite the first surface. Here a vertical distance between the first surface and the second surface inside the elevation may be greater than a vertical distance between the first surface and the second surface outside the elevation. The elevation is, in one example, defined by the vertical distance between the first surface and the second surface.

In example, the vertical distance varies between the first surface and the second surface inside the elevation. This results in the semi-finished product having a different material thicknesses after splitting in the area that was arranged on the elevation during splitting. An area of the semi-finished product skived by the method may be tapered, for example. The vertical distance between the first surface and the second surface may vary inside the elevation in the feed direction, and in one example, the vertical distance may steadily increase and/or decrease. In one example, the vertical distance varies such that the elevation has a concave and/or convex surface shape. Thus, any shapes can be skived in the semi-finished product.

In one form, the semi-finished product is placed on the first surface of the splitting template during the placement process. A surface of the semi-finished product facing away from the first surface of the splitting template may extend substantially parallel to the first surface of the splitting template. The second surface of the splitting template may be parallel to an imaginary splitting plane during splitting. The splitting plane is, in one example, defined by a cutting tip or cutting edge of the splitting tool and the feed direction.

In another form, the semi-finished product is removably fixed on the splitting template. The semi-finished product and the splitting templates are, in one example, removably fixed to each other using an adhesive. The removable fixation has the advantage that the semi-finished product may be separated from the splitting template and/or removed from the splitting template after splitting and fed for further processing.

The present disclosure also relates to a splitting template that is suitable for use according to one of the methods described above. The splitting template, in one variation, includes a material that comprises a silicone. The splitting template may be reused for a plurality of semi-finished products, which makes the method simple and cost-effective.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
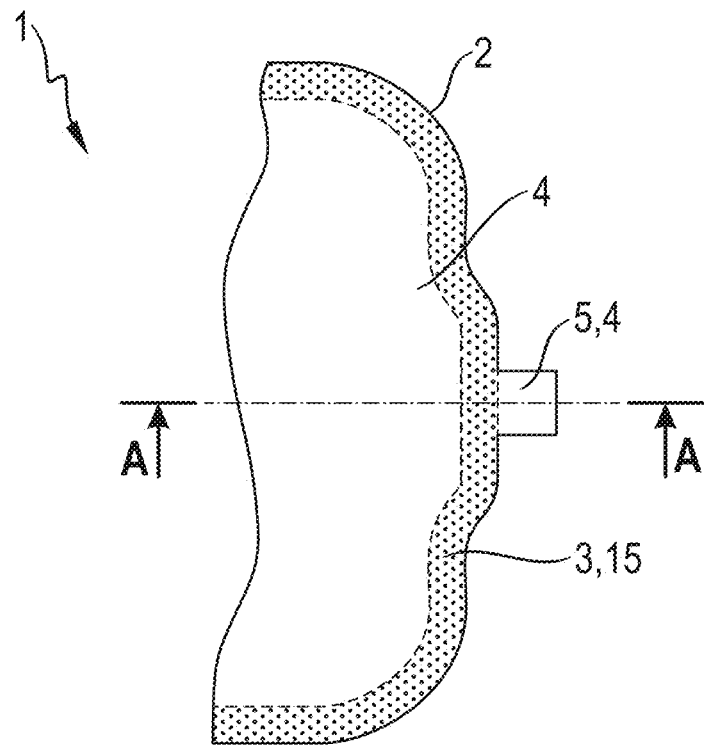
FIG. 1 shows a top view of a section of a semi-finished product in a schematic plan view which may be split according to a first form of the present disclosure.

The drawings described herein are for illustration purposes only and are not intended to limit the scope of the present disclosure in any way. The different and exemplary features described above can be combined with one another according to the present disclosure, provided this is technically expedient and suitable.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a section of a semi-finished product 1 in a schematic plan view. The semi-finished product 1 may have been cut from a blank. The semi-finished product 1 has obtained the desired outer contour 2 by being cut from the blank. In one form, the blank, and accordingly also the semi-finished product 1, includes leather. The semi-finished product 1, in one example, has a constant thickness.

The outer contour 2 is defined by the outer edges of the semi-finished product 1. In the example shown in FIG. 1, the outer contour 2 has a contour protrusion 5. The contour protrusion 5 is an irregularity in the course of the outer edge of the semi-finished product 1. The contour protrusion 5 can be, for example, a fixing tab 5, of which the semi-finished product 1 may be attached to another component in its later use.

The semi-finished product 1 includes an area 4 in which no material should be removed during splitting. No material should also be removed on the contour protrusion 5 during splitting. In contrast thereto, the area designated with reference numeral 3 indicates an area of the semi-finished product 1 in which material 15 should be removed from the semi-finished product 1 during splitting. In one example, the semi-finished product 1 may be skived in the area 3. In one example, area 3 is arranged between two areas 4 of the semi-finished product.

On the other hand, the areas 3, 4 differ from each other, and less material is removed from the semi-finished product 1 in area 4 than in area 3 during splitting. This means that basically the entire semi-finished product 1 is split, in which the material removal in area 3 is greater than in area 4. This is the case, for example, when the semi-finished product 1 in area 3 should not only be split, but also additionally be skived.

Figure 2:
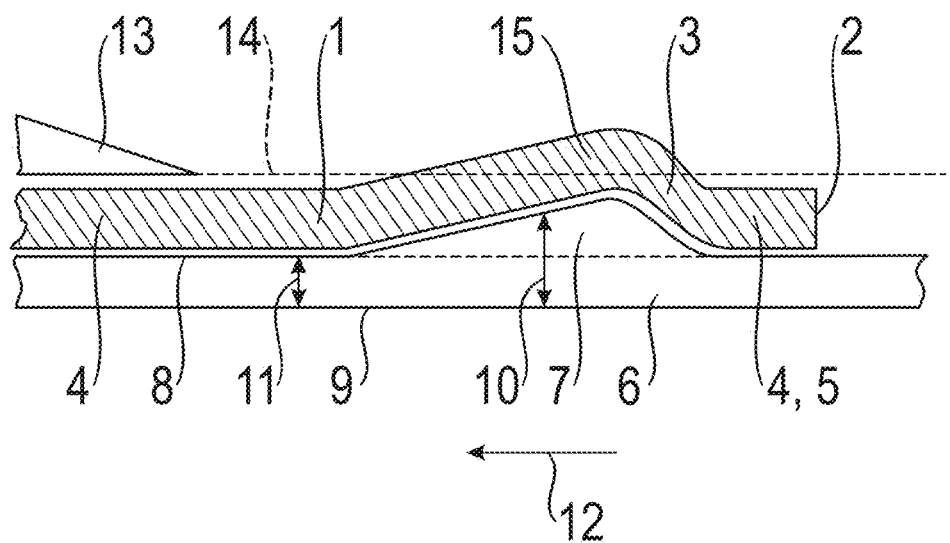
FIG. 2 shows a schematic cross-sectional view along section A-A of the semi-finished product shown in FIG. 1 and placed on a splitting template shortly before splitting according to the first form.

FIG. 2 shows a sectional view of the section A-A indicated in FIG. 1, through the semi-finished product 1, after the semi-finished product 1 has been placed on a splitting template 6. The splitting template 6 has an elevation 7, a first surface 8, and a second surface 9. The splitting template 6, in one example, includes or consists of silicone. The semi-finished product 1 and the splitting template 6 are removably connected with each other, in one example, removably adhered to each other via an adhesive.

The first surface 8 is arranged opposite the second surface 9. The semi-finished product 1 is placed on the first surface 8. In the example shown, the second surface 9 is parallel to an imaginary cutting plane 14.

The elevation 7 is defined such that a vertical distance 10 between the first surface 8 and the second surface 9 inside the elevation 7 is greater than a vertical distance 11 between the first surface 8 and the second surface 9 outside the elevation 7. The vertical distance 11 is a perpendicular distance between the first surface 8 and the second surface 9 outside the elevation 7. The vertical distance 11 between the first surface 8 and the second surface 9 varies inside the elevation 7. In a plan view that is not shown, the elevation 7 reproduces the outer contour 2. This means that the course of the elevation 7 corresponds to the course of the area 3 shown in FIG. 1. In this case, the contour protrusion 5 is not reproduced by the elevation 7.

As schematically shown in FIG. 2, the semi-finished product 1 is moved together with the splitting template 6 relative to a splitting tool 13 in the feed direction 12. This causes the area 3 of the semi-finished product 1, which area 3 is arranged on the elevation 7, to move toward the splitting tool 13. In the example shown, the splitting tool 13 is a cutting knife 13 that is arranged in the imaginary cutting plane 14. As soon as the area 3 reaches the tip of the cutting tool 13 and is moved together with the splitting template 6 further in the feed direction 12, material 15 is removed from the semi-finished product 1. This is referred to as splitting.

Due to the smaller vertical distance 11 outside the elevation 7, the first surface 8 outside the elevation 7 is spaced so far apart from the imaginary cutting plane 14 that no material is removed from the semi-finished product 1 in the area 4 of the semi-finished product 1 and in the contour protrusion 5. The vertical distance between the first surface 8 of the splitting template 6 and the imaginary splitting plane 14 is greater in the area 4 of the semi-finished product 1 than the material thickness of the semi-finished product 1.

In an alternative, second form that is not shown, the vertical distance between the first surface 8 of the splitting template 6 and the imaginary cutting plane 14 in area 4 of the semi-finished product 1 can be smaller than the material thickness of the semi-finished product 1. This causes the entire semi-finished product 1 to be, in one example, split by the splitting tool 13. Here the elevation 7 is, in one example, configured such that the material thickness of the semi-finished product 1 is smaller in area 3 than the material thickness in area 4 after splitting. In area 3 of the semi-finished product, more material 15 is removed in each example than in area 4. This is due to the area 3 being arranged on the elevation 7 during splitting.

Figure 3:
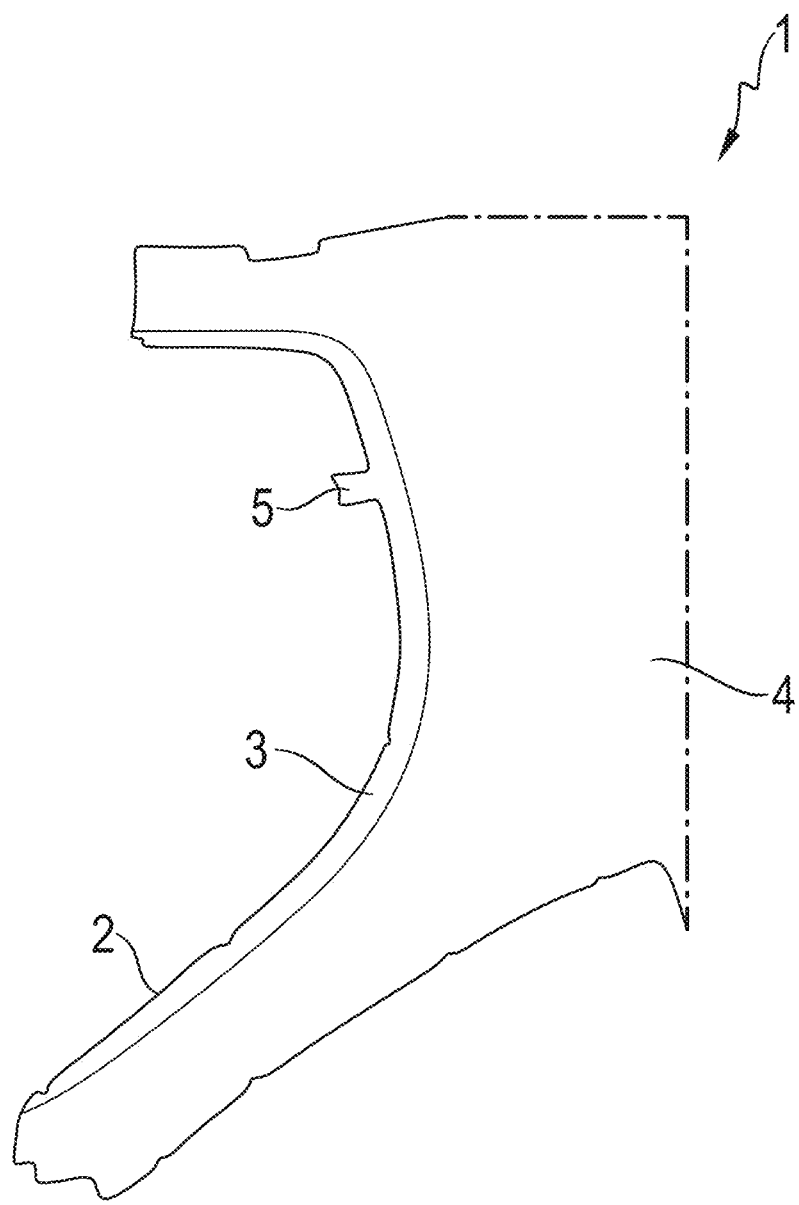
FIG. 3 shows a top view of a section of a semi-finished product which has been split according to a second form of the splitting method according to the present disclosure.

FIG. 3 shows one form of a semi-finished product 1, which has been split according to the method according to the second form. In one example, the entire semi-finished product 1 has been split. The area 3 of the semi-finished product 1 has additionally been skived. This means that more material has been removed from the semi-finished product 1 in area 3 than in area 4 during splitting, and, in one example, in the contour protrusion 5. After splitting, the semi-finished product 1 has the same material thickness in the contour protrusion 5 as in the area 4. The area 3 extends between the area 4 and the contour protrusion 5.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for splitting a semi-finished product, the method comprising:
    placing the semi-finished product on a first surface of the splitting template, the splitting template including at least one elevation that protrudes above the first surface of the splitting template;
    fixing the semi-finished product on the splitting template, with a first area of the semi-finished product arranged on the at least one elevation and at least one second area of the semi-finished product not arranged on the at least one elevation, the at least one second area including a fixing tab; and
    splitting the semi-finished product, with material removed from the first area of the semi-finished product during splitting and no material removed from the semi-finished product in the at least one second area, and the material removal in the first area that is arranged on the at least one elevation is greater than in the at least one second area that is not arranged on the at least one elevation.

2. The method according to claim 1, wherein the at least one elevation reproduces an outer contour of the semi-finished product.

3. The method according to claim 1, wherein the at least one elevation causes the semi-finished product to have a first material thickness after the splitting in the first area which was arranged on the at least one elevation during the splitting, and the first area with the first material thickness is arranged between two of the at least one second area of the semi-finished product having a second material thickness after the splitting, wherein the first material thickness is smaller than the second material thickness.

4. The method according to claim 1, wherein the semi-finished product and the splitting template are moved relative to a splitting tool in a feed direction during the splitting.

5. The method according to claim 1, wherein a splitting tool is moved relative to the semi-finished product and the splitting template in a feed direction during splitting.

6. The method according to claim 1, wherein the splitting template has the first surface and a second surface opposite the first surface, wherein a vertical distance between the first surface and the second surface inside the at least one elevation is greater than a perpendicular distance between the first surface and the second surface outside of the at least one elevation.

7. The method according to claim 6, wherein the vertical distance between the first surface and the second surface varies inside the at least one elevation, and the semi-finished product has various material thicknesses after splitting in the first area which was arranged on the at least one elevation during splitting.

8. The method according to claim 6, wherein the second surface of the splitting template is parallel to an imaginary splitting plane during the splitting.

9. The method according to claim 1, wherein the semi-finished product and the splitting template are removably fixed to each other via an adhesive.

10. The method according to claim 1, wherein the semi-finished product comprises leather.

11. The method according to claim 1, wherein the splitting template comprises silicone.

* * * * *